United States Patent
Zhong et al.

(10) Patent No.: US 12,519,740 B2
(45) Date of Patent: Jan. 6, 2026

(54) METHOD TO RESET SWITCH WHEN CONTROLLER FAULT IS DETECTED

(71) Applicant: SUZHOU METABRAIN INTELLIGENT TECHNOLOGY CO., LTD., Jiangsu (CN)

(72) Inventors: Ji Zhong, Jiangsu (CN); Weibin Kong, Jiangsu (CN); Changshun Wu, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/870,425

(22) PCT Filed: Jun. 28, 2023

(86) PCT No.: PCT/CN2023/103411
§ 371 (c)(1),
(2) Date: Nov. 28, 2024

(87) PCT Pub. No.: WO2024/113818
PCT Pub. Date: Jun. 6, 2024

(65) Prior Publication Data
US 2025/0286836 A1    Sep. 11, 2025

(30) Foreign Application Priority Data
Nov. 30, 2022 (CN) .......... 202211519689.X

(51) Int. Cl.
*H04L 49/55* (2022.01)
*G06F 13/42* (2006.01)
*H04L 49/65* (2022.01)

(52) U.S. Cl.
CPC ........ *H04L 49/557* (2013.01); *G06F 13/4221* (2013.01); *H04L 49/65* (2013.01)

(58) Field of Classification Search
CPC ......... H04L 49/57; H04L 49/65; H04L 49/55; G06F 13/4221
See application file for complete search history.

(56) References Cited

U.S. PATENT DOCUMENTS

| 2016/0077799 A1 | 3/2016 | Matsui et al. |
| 2019/0272249 A1* | 9/2019 | Olarig ................ G06F 3/0655 |
| 2020/0341929 A1* | 10/2020 | Lambert ............ G06F 13/4221 |

FOREIGN PATENT DOCUMENTS

| CN | 103078747 A | 5/2013 |
| CN | 106201755 A | 12/2016 |

(Continued)

*Primary Examiner* — Jackie Zuniga Abad
*Assistant Examiner* — Latresa A McCallum
(74) *Attorney, Agent, or Firm* — IPro, PLLC

(57) ABSTRACT

Provided are a switch reset system and method, a non-transitory readable storage medium, and an electronic device. The system includes: a processor connected to a switch by means of a data transmission link; a complex programmable logic device connected to the processor and the switch, and configured to receive signal flag bit information sent by the processor, and process a reset signal in the switch on the basis of the signal flag bit information, wherein the signal flag bit information is used for indicating that data transmission between the switch and the processor is abnormal; and the switch, configured to receive a processed reset signal sent by the complex programmable logic device and perform a reset operation.

18 Claims, 7 Drawing Sheets

(56) References Cited

FOREIGN PATENT DOCUMENTS

| CN | 111984573 A | * 11/2020 | ............... G06F 1/24 |
| --- | --- | --- | --- |
| CN | 112256479 A | 1/2021 | |
| CN | 112579400 A | 3/2021 | |
| CN | 113688087 A | * 11/2021 | .......... G06F 11/1441 |
| CN | 115550291 A | 12/2022 | |

* cited by examiner

METHOD TO RESET SWITCH WHEN CONTROLLER FAULT IS DETECTED

CROSS-REFERENCE TO RELATED APPLICATION

The application claims priority to Chinese Patent Application No. 202211519689.X, entitled "SWITCH RESET SYSTEM AND METHOD, STORAGE MEDIUM, AND ELECTRONIC DEVICE" filed to the China National Intellectual Property Administration on Nov. 30, 2022, which is incorporated herein by reference in its entirety.

TECHNICAL FIELD

Embodiments of the disclosure relate to the field of computers, in particular to a switch reset system and method, a non-transitory readable storage medium, and an electronic device.

BACKGROUND

The non-transparent bridging (NTB) technology based on the peripheral component interconnect express (PCIe) has been widely applied in Internet platforms. However, the NTB has limited applications in platforms with domestic central processing units (CPU). Due to inherent flaws in domestic CPUs, unpredictable problems may arise during use when a single controller needs to be hot-swapped or a controller needs to be reset. The domestic CPUs are unable to achieve a direct connection between two controllers, and a PCIe-based NTB technology needs to be used to connect two controllers. If the controller malfunctions and needs to be repaired, no effective solution for repairing the controller fault has been proposed in related art.

SUMMARY

Embodiments of the disclosure provide a switch reset system and method, a non-transitory readable storage medium, and an electronic device.

A first aspect provides a switch reset system, including: a processor connected to a switch through a data transmission link; a complex programmable logic device (CPLD) connected to the processor and the switch, wherein the CPLD is configured to receive signal flag bit information transmitted from the processor, and process a reset signal in the switch based on the signal flag bit information, wherein the signal flag bit information is used for indicating that data transmission between the switch and the processor is abnormal; and the switch, the switch being configured to receive a processed reset signal transmitted from the CPLD and perform a reset operation.

In an exemplary embodiment, the processor is further configured to read data in the switch through the data transmission link and determine whether the switch is reset after the reset signal is processed.

In an exemplary embodiment, the system further includes an inter-integrated circuits (IIC) bus connected to the processor and the CPLD.

In an exemplary embodiment, the CPLD is further configured to transmit feedback information to the processor in response to the reset signal being processed based on the signal flag bit information, wherein the feedback information is used for indicating that the signal flag bit has triggered the CPLD to process the reset signal.

In an exemplary embodiment, the signal flag bit information includes information on cold reset of the switch.

In an exemplary embodiment, the processor further includes a reception control (RC) device connected to the switch and configured to transmit a downstream to the switch.

In an exemplary embodiment, the switch further includes a direct memory access (DMA) device connected to the processor and configured to transmit an upstream to the processor.

A second aspect provides a method for setting a switch, applied to the switch reset system described above, including: receiving signal flag bit information transmitted from a processor, wherein the signal flag bit information is used for indicating that data transmission between the switch and the processor is abnormal; processing a reset signal of the switch based on the signal flag bit information; and transmitting a processed reset signal to the switch to instruct the switch to perform a reset operation.

A third aspect provides a method for repairing a data transmission link, applied to the switch reset apparatus described above, including: transmitting signal flag bit information to a complex programmable logic device (CPLD) to instruct the CPLD to process a reset signal of the switch based on the signal flag bit information, wherein the signal flag bit information is used for indicating that data transmission between the switch and the processor is abnormal, and the switch is configured to receive a processed reset signal transmitted from the CPLD and perform a reset operation; detecting a bandwidth performance of peripheral component interconnect express in the switch, wherein the switch is connected to the processor through a data transmission link; and repairing the data transmission link based on the bandwidth performance.

A fourth aspect provides a switch reset apparatus, including: a first reception module, configured to receive signal flag bit information transmitted by a processor, wherein the signal flag bit information is used for indicating that data transmission between the switch and the processor is abnormal; a first processing module, configured to process a reset signal of the switch based on the signal flag bit information; and a first reset module, configured to transmit a processed reset signal to the switch to instruct the switch to perform a reset operation.

A fifth aspect provides an apparatus for repairing a data transmission link, including: a first transmission module, configured to transmit signal flag bit information to a complex programmable logic device (CPLD) to instruct the CPLD to process a reset signal of the switch based on the signal flag bit information, wherein the signal flag bit information is used for indicating that data transmission between the switch and the processor is abnormal, and the switch is configured to receive a processed reset signal transmitted from the CPLD and perform a reset operation; a first detection module, configured to detect a bandwidth performance of peripheral component interconnect express in the switch, wherein the switch is connected to the processor through a data transmission link; and a first repair module, configured to repair the data transmission link based on the bandwidth performance.

A sixth aspect provides a non-transitory computer-readable storage medium, the storage medium is stored with a computer program that, when executed, implements steps of any method described above.

A seventh aspect provides an electronic device, including a memory, a processor, and a computer program stored in the memory that, when executed by the processor, implement steps of any method described above.

DETAILED DESCRIPTION OF THE EMBODIMENTS

Embodiments of the disclosure will be described below in detail with reference to the accompanying drawings and in conjunction with embodiments.

It should be noted that terms "first", "second" and the like in the description and claims, as well as the above-mentioned drawings, of the disclosure are used to distinguish similar objects, but not necessarily used to describe a specific order or precedence order.

The related technologies are described below.

Node indicates a node or a controller.

NTB indicates non-transparent bridging.

CPU indicates a central processing unit.

ARM indicates an ARM (Advanced RISC Machine) processor.

DIMM indicates Dual-Inline-Memory-Modules.

PCIe indicates Peripheral Component Interconnect Express.

RC indicates reception control.

DMA indicates direct memory access.

Active-active is a configuration mode of a system or a network architecture, in which two identical servers are provided, and a load balancer uses is used to schedule requests. The algorithm of the load balancer may be round-robin, i.e. a first request is sent to server 1, a second request is sent to server 2, a third request is sent to server 1, and so on. The two servers may be completely identical.

Active-passive indicates a configuration mode of a system or a network architecture, in which two server nodes are also provided. However, for most of the time, an active or master server (a device in an active state) is used for providing services, and when the master server malfunctions, the other passive server (backup server) is used as a backup. Like the active-active mode, the two servers should also be completely identical in the active-passive mode. Either active-active or active-passive can solve the problem of high availability of the server.

Switch indicates a switch evolved from a network bridge. A switch performs tasks of filtering, learning, and forwarding using hardware, whereas a network bridge accomplishes these tasks with software.

A PCIE Switch provides expansion or aggregation capabilities and allows more devices to be connected to a single PCIe port. The PCIE Switch acts as a packet router that identifies which path a given packet needs to take based on an address or other routing information. The PCIE Switch is a PCIe-to-PCIe bridge.

Cold Reset means that a power supply is powered off, and then powered on to restart a computer.

Hot Reset means that a computer is restarted under the control of software without powering off the power supply.

PCI-E (PCI-Express) is a general bus specification, which is advocated and promoted by Intel, and an ultimate design object of PCI-E is to replace a bus transmission interface inside the existing computer system, which includes not only a display interface, but also a CPU, a peripheral component interconnect (PCI) interface, a hard disk drive (HDD), a network and other application interfaces.

Figure 1:
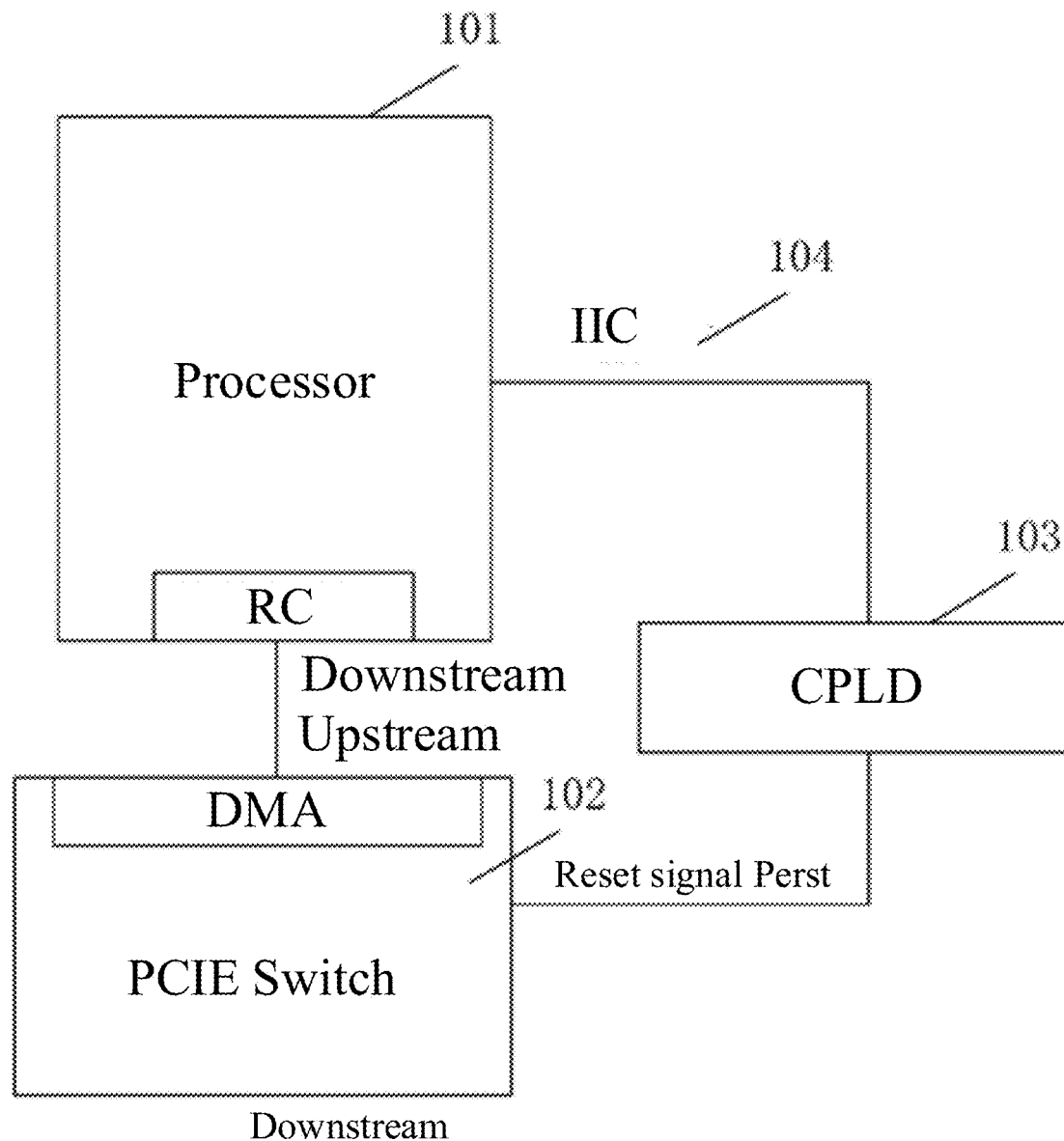
FIG. 1 is a structural block diagram of a switch reset system according to an embodiment of the disclosure.

An embodiment provides a switch reset system. FIG. 1 is a structural block diagram of a switch reset system according to an embodiment of the disclosure. As shown in FIG. 1, the switch reset system includes a processor 101, a complex programmable logic device (CPLD) 103 and a switch 102.

The processor 101 is connected to the switch 102 through a data transmission link.

The CPLD 103 is connected to the processor 101 and the switch 102, and configured to receive signal flag bit information transmitted from the processor 101, and process a reset signal of the switch 102 based on the signal flag bit information. The signal flag bit information is used for indicating that data transmission between the switch 102 and the processor 101 is abnormal.

The switch 102 is configured to receive a processed reset signal transmitted from the CPLD 103 and perform a reset operation.

This embodiment may be applied to a data storage service scenario. In this scenario, two controllers are required to work in coordination, and correspond to two processors, i.e., a master processor and a slave processor. The two processors work in coordination. The two processors both support five inter-integrated circuits (IIC) bus, eight DIMM accesses and one hundred and twenty-eight PCIes, and support GEN3 (PCI Express 3.0, third generation PCI Express). The two processors are connected through a PCIe-based NTB technology. NTB has already been integrated in some Intel processors, such that two controllers with independent input/output (IO) or memory domains can be communicated and interacted directly.

Figure 2:
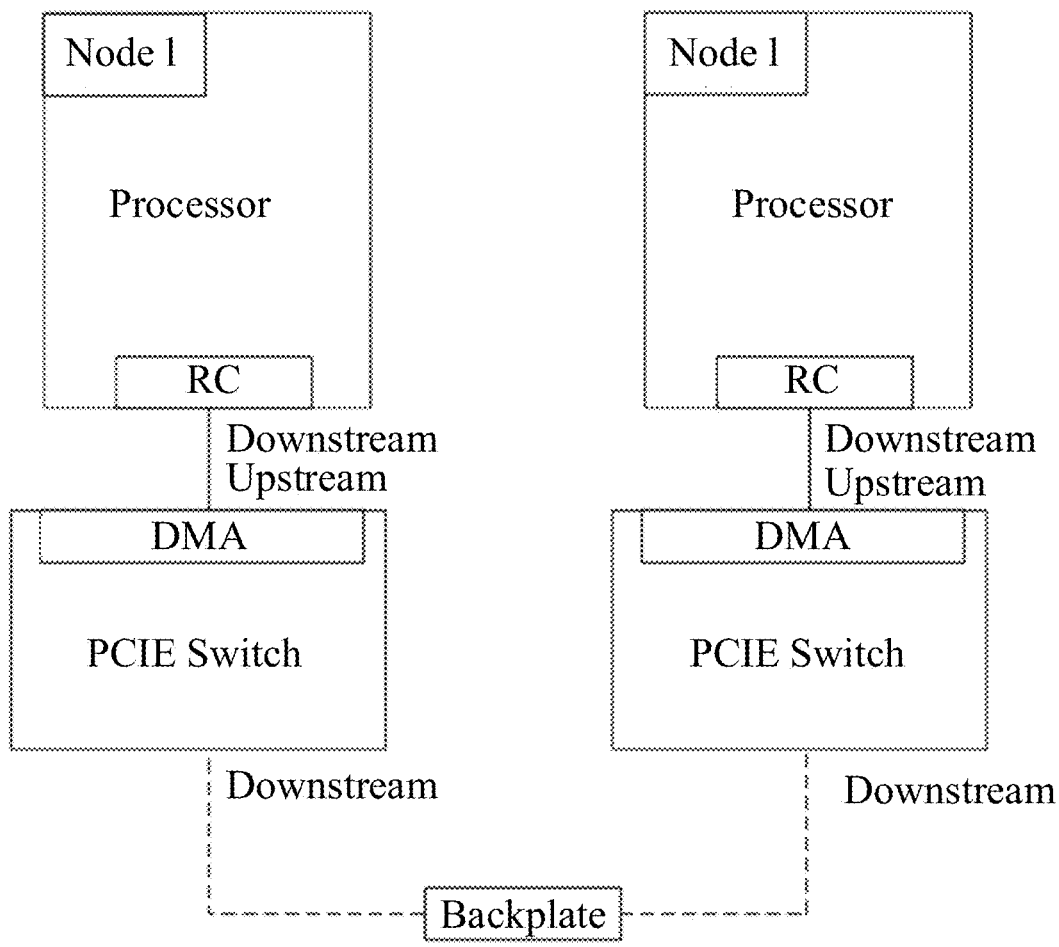
FIG. 2 is a PCIe-based NTB bus topology diagram according to an embodiment of the disclosure.

For example, as shown in FIG. 2, an NTB port between the two controllers is connected to an upstream port of a PCIE Switch through RC of a CPU in the controller 1 (Node 1), and the bandwidth is GEN3×16 (PCI Express 3.0×16, third PCI Express×16). Meanwhile, a downstream port is connected to a PCIE Switch for the controller 2 (Node 2) back to back through a back plate, that is, Node 2 and Node 1 are symmetrically connected. In this embodiment, the NTB and the PCIe Switch support both the Active-Active scheme and the Active-Passive scheme. For the Active- Passive scheme, two nodes are connected to a Link port at one end and to a virtual port (virtual link) at the other end, and this scheme supports a Failing operation. For the Active-Active scheme, since the two nodes are completely symmetrical, if any node experiences a Failing, the other node acts as the primary, and the failing Node acts as the slave. Once the failing Node is repaired or replaced, it can continue to support an unlimited number of Failing operations.

Figure 3:
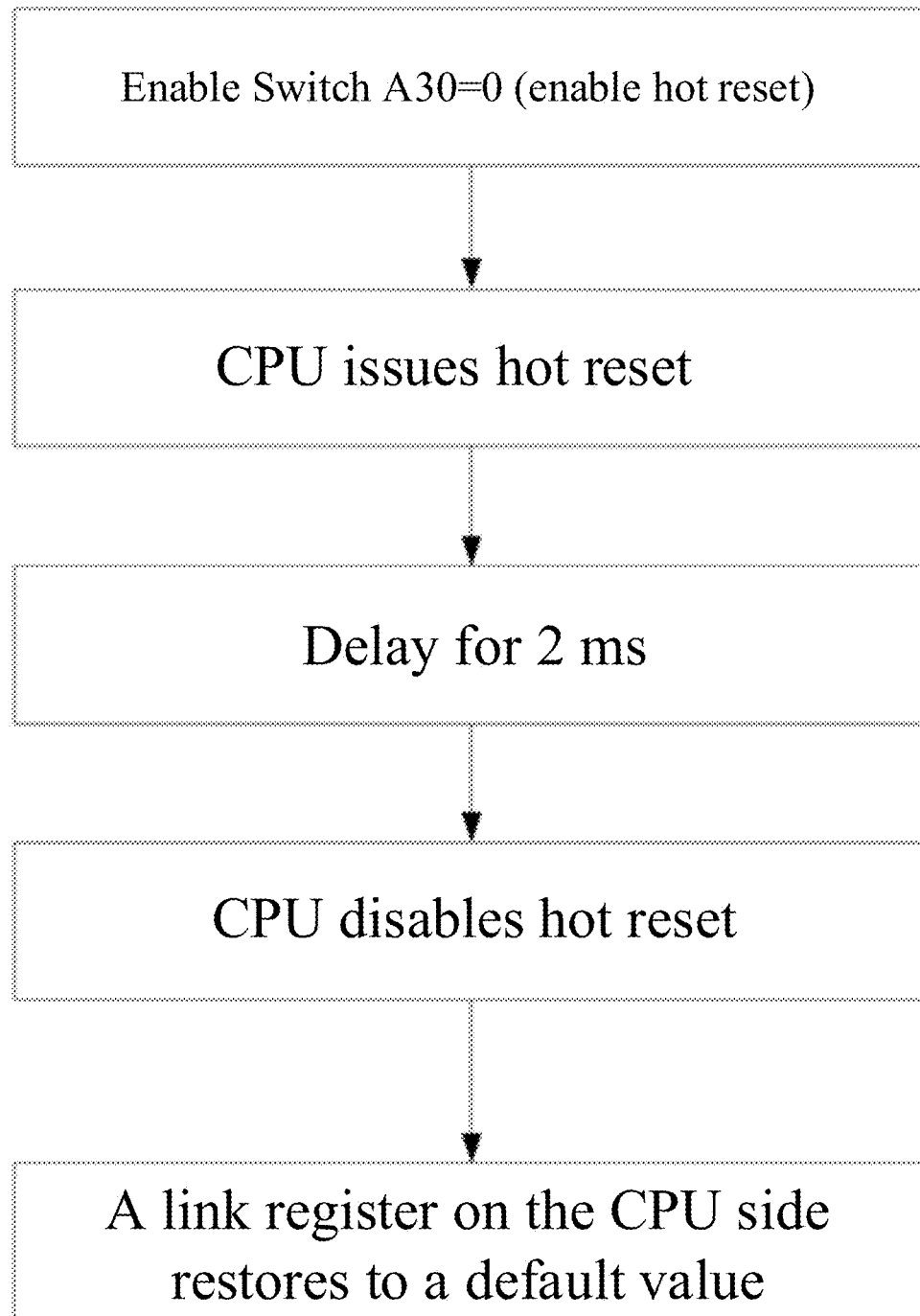
FIG. 3 is a flowchart of issuing hot reset by CPU according to an embodiment of the disclosure.

In an embodiment, as shown in FIG. 2, if one node is unplugged or restarted, the other node needs to repair or replace the PCIe Switch, then a link between the CPU and the PCIe Switch will degrade probabilistically. That is, the link will be degraded to other bandwidths from GEN3×16, resulting in controller fault. For a repair strategy for the node experiencing Failing, schemes currently adopted include an in-band PCIE management hot reset scheme. As shown in FIG. 3, the CPU issues hot reset to the PCIe Switch through a PCIe link, and a Downstream end performs transparent transmission through a TS1/TS2 (Time Slot 1/Time Slot 2) sequence in a PCIe protocol. By capturing a PCIe timing with a protocol analyzer and analyzing it with a CPU manufacturer, the PCIe timing problem of the CPU leads to defective CPU support for hot reset and probabilistic lane degradation.

As shown in FIG. 1, in this embodiment, the processor 101 (CPU) is communicated with the CPLD 103 through an inter-integrated circuit (IIC) channel 104.

In an embodiment, the processor 101 is further configured to read data in the switch through a data transmission link after the reset signal is processed, so as to determine whether the switch is reset. The data transmission link may be PCIE.

In an embodiment, the CPLD 103 is further configured to transmit feedback information to the processor 101 after processing the reset signal based on the signal flag bit information. The feedback information is used for indicating that the signal flag bit has triggered the CPLD 103 to process the reset signal.

In an embodiment, the signal flag bit information includes information on cold reset of the switch 102.

Figure 4:
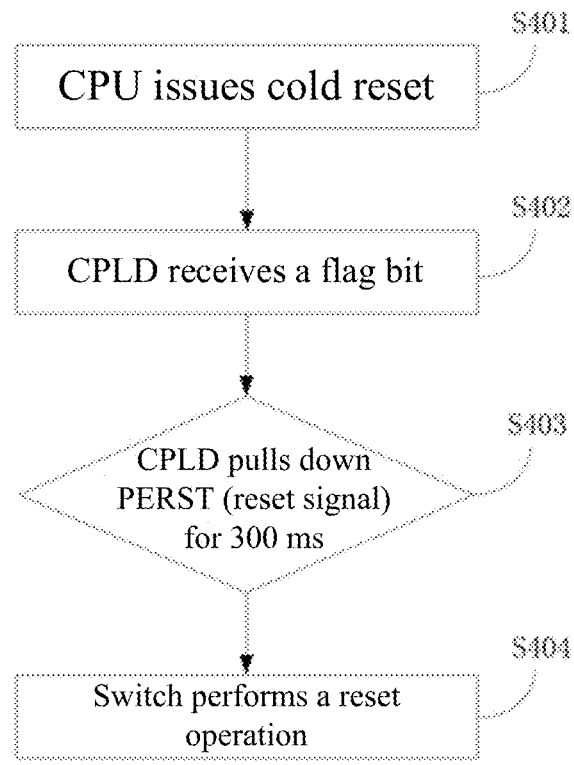
FIG. 4 is a flowchart illustrating data interaction among a processor, a switch and a complex programmable logic device (CPLD) according to an embodiment of the disclosure.

As shown in FIG. 4 which is a flowchart illustrating data interaction among the processor 101 (CPU), the switch 102 and the CPLD 103 in this embodiment, the following steps are included.

At S401, the CPU issues signal flag bit information (e.g., cold reset) to the CPLD through the IIC channel.

At S402, the signal flag bit information is received by the CPLD.

At S403, the CPLD actively pulls down the reset signal (e.g., a PCI express reset (PERST) signal) for 300 milliseconds.

At S404, the Switch is triggered to enter cold reset, that is, the Switch starts to reset after the CPLD pulled down the PERST signal for 300 milliseconds.

Moreover, the CPLD transmits a flag indicating that the cold reset is triggered and completed to the CPU through the IIC channel, and the count of pull-down reset is increased by one.

For the above switch reset system including the processor 101, the CPLD 103 and the switch 102, the processor 101 being connected to the CPLD 103 and the switch 102, in the event of a data transmission fault between the processor 101 and the switch 102, the processor 101 transmits the signal flag bit information to the CPLD 103, the CPLD 103 processes the reset signal of the switch 102 and transmits the processed reset signal to the switch 102 for reset. That is, the controller fault can be repaired by hardware. Therefore, the problem that the controller fault cannot be effectively repaired in related technologies can be solved, and the controller fault can be repaired quickly and accurately.

Figure 5:
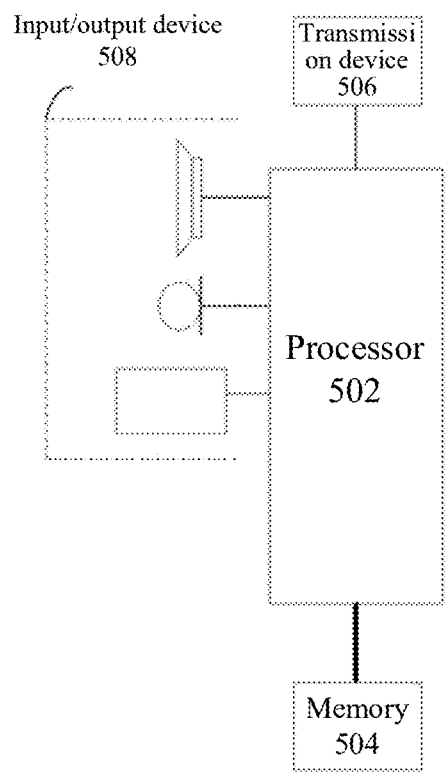
FIG. 5 is a block diagram of a hardware structure of a mobile terminal for executing a method for resetting a switch according to an embodiment of the disclosure.

The method embodiment provided in the disclosure may be executed on a mobile terminal, a computer terminal, or similar computing equipment. Taking the method being run on a mobile terminal as an example, FIG. 5 is a block diagram of a hardware structure of a mobile terminal for executing a method for resetting a switch according to an embodiment of the disclosure. As shown in FIG. 5, the mobile terminal may include one or more (only one is shown in FIG. 5) processors 502 (the processor 502 may include, but not limited to, a processing apparatus such as a microcontroller unit (MCU) or a field-programmable gate array (FPGA), and a memory 504 configured to store data. The mobile terminal may further include a transmission device 506 configured for communication functions and an input/output device 508. Those skilled in the art may understand that the structure shown in FIG. 5 is only for illustration, and is not intended to limit the structure of the mobile terminal. For example, the mobile terminal may further include more or fewer components than those shown in FIG. 5, or have a different configuration from that shown in FIG. 5.

The memory 504 may be configured to store computer programs such as software programs and modules of application software, for example computer programs corresponding to the method for resetting a switch in the embodiments of the disclosure. The processor 502 is configured to run the computer programs stored in the memory 504 to execute various functional applications and data processing, i.e., implementing the above method. The memory 504 may include a high-speed random access memory or a non-transitory memory, such as one or more magnetic storage devices, a flash memory, or other non-transitory solid-state memory. Alternatively, in some examples, the memory 504 may be remotely provided with respect to the processor 502, and the remote memory may be connected to the mobile terminal through a network. Examples of the networks include, but are not limited to, the Internet, an intranet, a local area network, a mobile communication network, and combinations thereof.

The transmission device 506 is configured to receive or transmit data through a network. The optional examples of the network may include a wireless network provided by a communication provider of the mobile terminal. In an example, the transmission device 506 includes a network interface controller (NIC) that may be connected to other network devices through a base station to communicate with the Internet. In an example, the transmission device 506 may be a radio frequency (RF) module that is configured to communicate with the Internet in a wireless manner.

This embodiment of the disclosure may be run on an architecture of a switch reset apparatus shown in FIG. 1.

Figure 6:
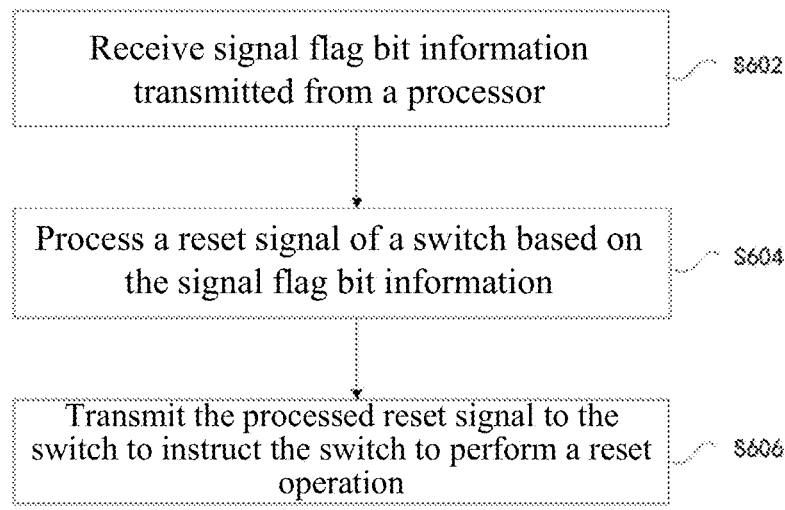
FIG. 6 is a flowchart of a method for resetting a switch according to an embodiment of the disclosure.

This embodiment provides a method for resetting a switch. FIG. 6 is a flowchart of a method for resetting a switch according to the embodiment of the disclosure. As shown in FIG. 6, the flow chart includes steps described below.

At step S602, signal flag bit information is received from a processor, and the signal flag bit information is used for indicating that data transmission between a switch and the processor is abnormal.

At step 604, a reset signal of the switch is processed based on the signal flag bit information.

At step S606, a processed reset signal is transmitted to the switch to instruct the switch to perform a reset operation.

The above steps may be executed by the CPLD, etc., but is not limited thereto.

This embodiment may be applied to a data storage service scenario. In this scenario, two controllers are required to work in coordination, and correspond to two processors, i.e., a master processor and a slave processor. The processor in this embodiment may be a master processor or a slave processor. The processor may support five IICs, eight DIMM accesses and one hundred and twenty-eight PCIes, and support GEN3, and achieve the connectivity through a PCIe-based NTB technology.

In an embodiment, the reset signal may be a PERST signal. The switch may be Switch. For example, Switch starts to reset after the CPLD pulls down the PERST signal for 300 ms. The CPLD transmits a flag indicating that the cold reset is triggered and completed to the CPU through the IIC channel, and a count of pull-down reset is increased by one.

In an embodiment, the signal flag bit information includes information on cold reset of the switch 102.

In an embodiment, the processor further includes a RC device connected to the switch and configured to transmit a downstream to the switch.

In an embodiment, the switch further includes a DMA device connected to the processor and configured to transmit an upstream to the processor.

Through the above steps, the signal flag bit information is received from the processor by the CPLD, where the signal flag bit information is used for indicating that data transmission between the switch and the processor is abnormal; the CPLD processes the reset signal of the switch based on the signal flag bit information; and the CPLD transmits the processed reset signal to the switch to instruct the switch to perform a reset operation. That is, the controller fault can be repaired by hardware. Therefore, the problem that the controller fault cannot be effectively repaired in related technologies can be solved, and the controller fault can be repaired quickly and accurately.

In an exemplary embodiment, the signal flag bit information is received from the processor through S11, in which the signal flag bit information transmitted from the processor is received through an IIC. The reset signal of the switch is processed based on the signal flag bit information through S12, in which the reset signal is released by pulling down the reset signal to obtain a pull-down signal, and then performing a pull-up operation on the pull-down signal.

In an embodiment, the object of releasing the reset signal can be achieved by pulling down the reset signal and then performing the pull-up operation. After the reset signal is released, Switch is triggered to enter cold reset for a reset operation. Therefore, the switch is reset through an external device.

In an exemplary embodiment, after the reset signal of the switch is processed based on the signal flag bit information, the method further includes steps below.

At S21, feedback information is transmitted to the processor, and the feedback information is used for indicating that the signal flag bit has triggered the processing of the reset signal.

At S22, the count that the data transmission link is repaired is recorded.

In an embodiment, the feedback information may take the form of, but is not limited to, text information or voice information. For example, the CPLD transmits a flag indicating that the cold reset is triggered and completed to the CPU through the IIC channel, and the count of pull-down reset is increased by one.

In an embodiment, if data in a register may be detected by means of software after the switch is reset by hardware, it may be determined that the data transmission between the processor and the switch is normal. If the data in the register cannot not detected, or the data acquired from the register is transmitted at a relatively low speed, it can be determined that there is a fault in the data transmission between the processor and the register.

Figure 7:
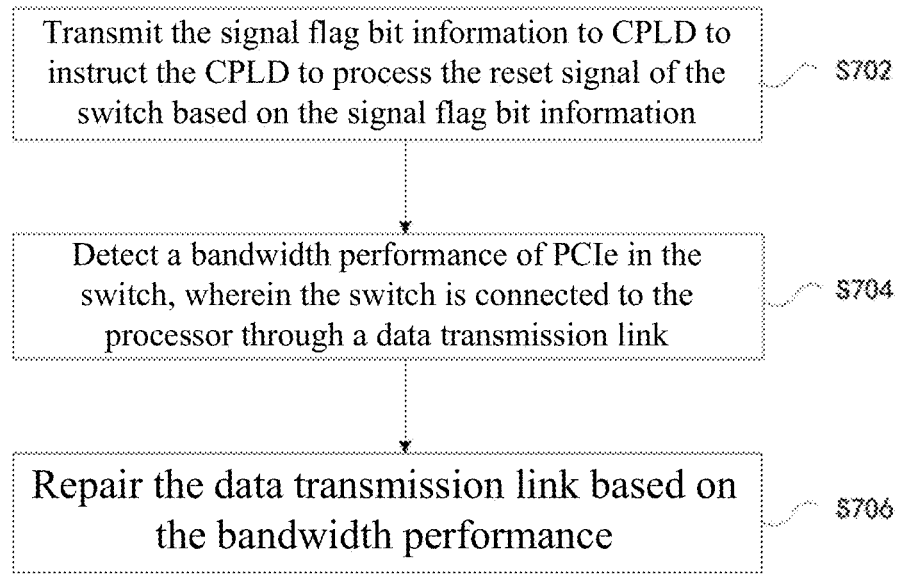
FIG. 7 is a flowchart of a method for repairing a data transmission link according to an embodiment of the disclosure.

An embodiment provides a method for repairing a data transmission link, which is applied to the switch reset apparatus. FIG. 7 is a flowchart of a method for repairing a data transmission link according to the embodiment of the disclosure. As shown in FIG. 7, this method includes steps described below.

At step S702, signal flag bit information is transmitted to a CPLD to instruct the CPLD to process a reset signal of a switch based on the signal flag bit information, the signal flag bit information is used for indicating that data transmission between the switch and the processor is abnormal, and the switch is configured to receive the processed reset signal transmitted from the CPLD and perform a reset operation.

At step S704, a bandwidth performance of peripheral component interconnect express in the switch is detected, and the switch is connected to the processor through a data transmission link.

At step S706, the data transmission link is repaired based on the bandwidth performance.

The above steps may be executed by a processor such as CPU, but is not limited thereto.

This embodiment may be applied to a data storage service scenario. In this scenario, two controllers are required to work in coordination, and correspond to two processors, i.e., a master processor and a slave processor. The processor in this embodiment may be a master processor or a slave processor. The processor may support five IICs, eight DIMM accesses and one hundred and twenty-eight PCIes, and support GEN3, and achieve the connectivity through a PCIe-based NTB technology.

In an embodiment, the reset signal may be a PERST signal. The switch may be Switch. For example, Switch starts to reset after the PERST signal is pulled down by the CPLD for 300 ms. The CPLD transmits a flag indicating that the cold reset is triggered and completed to the CPU through the IIC channel, and the count of pull-down reset is increased by one.

In an embodiment, the signal flag bit information includes information on cold reset of the switch 102.

In an embodiment, the processor further includes a RC device connected to the switch and configured to transmit a downstream to the switch.

In an embodiment, the switch further includes a DMA device connected to the processor and configured to transmit an upstream to the processor.

In an embodiment, after the switch is reset by means of hardware, whether the data transmission between the processor and the switch is normal is detected. If an abnormality is detected, it is repaired by means of software.

Figure 8:
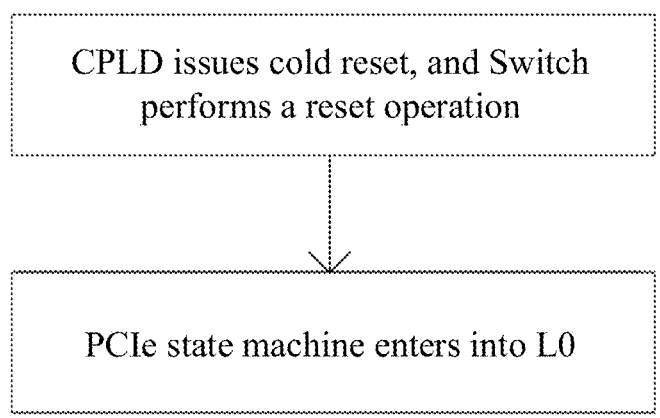
FIG. 8 is a flowchart in which PCIe timing enters into L0 state of state machine after the reset is completed according to an embodiment of the disclosure.

In an embodiment, the repair method by means of software is performed in a PCIe band. For example, as shown in FIG. 8, after the CPU transmits the signal flag bit information (e.g., cold reset), the switch starts to reset, and PCIe timing enters into L0 state of the state machine after the reset is completed. The CPU detects whether a PCIe device connected to Switch has an expected GEN3×16 bandwidth. If an anomaly exists, repair actions are taken; otherwise, the system boots up normally.

Through the above steps, the signal flag bit information is transmitted to the CPLD to instruct the CPLD to process the reset signal of the switch based on the signal flag bit information, the signal flag bit information being used for indicating that data transmission between the switch and the processor is abnormal, and the switch is configured to receive the processed reset signal transmitted from the CPLD and perform a reset operation; the bandwidth performance of the peripheral component interconnect express in the switch is detected, the switch is connected to the processor through the data transmission link; and the data transmission link is repaired based on the bandwidth performance. Therefore, the controller fault can be repaired by means of the combination of hardware and software. Therefore, the problem that the controller fault cannot be effectively repaired in related technologies can be solved, and the controller fault can be repaired quickly and accurately.

In an exemplary embodiment, after the signal flag bit information is transmitted to the CPLD, the method further includes step S31.

At S31, data in the switch is read through the data transmission link after the reset signal is processed, so as to determine whether the switch is reset.

In an embodiment, the data transmission link may be the PCIe as shown in FIG. 1. For example, the data in the register in Switch is read through the PCIe. If the data can be read, then the switch is reset and the data can be transmitted normally, otherwise, the data transmission link is repaired, such that the normal transmission of the data can be guaranteed.

In an exemplary embodiment, the data transmission link is repaired based on the bandwidth performance through S41.

At S41, if the bandwidth performance does not meet a preset bandwidth performance, the bandwidth performance is degraded to repair the data transmission link.

In an embodiment, after the reset of the switch is completed, the PCIe timing enters the L0 state of the state machine; the CPU checks whether the PCIe connection with the switch is at the preset bandwidth (for example, GEN3×16). If it is the expected value, the system operates normally; otherwise, the PCIe port (Peripheral Component Interconnect Express port) is disabled/enabled to repair the data transmission link.

In an exemplary embodiment, after the step, in which the bandwidth performance is degraded to repair the data transmission link if the bandwidth performance does not meet a preset bandwidth performance, the method further includes S51.

At S51, if the bandwidth performance is degraded to the preset performance, or the count that the data transmission link is repaired is greater than a preset number, the data transmission link is determined to be in a repair abnormal state. The repair abnormal state includes a state that the data transmission link fails to be repaired.

In an exemplary embodiment, the bandwidth performance of the peripheral component interconnect express in the switch is detected by steps described below.

At S1, data included in the register in the switch is read through the data transmission link.

At S2, the bandwidth performance of the peripheral component interconnect express in the switch is detected based on the data read from the register.

In an embodiment, if the data in the register is detected, it may be determined that the data transmission between the processor and the switch is normal. If the data in the register is not detected, or the data acquired from the register is transmitted at a relatively low speed, it can be determined that a fault exists in the data transmission between the processor and the register.

In an embodiment, if the bandwidth is degraded to L0 state or the count of repair exceeds 3, no repair is performed any more, the system boots up directly, and an error information is displayed.

Figure 9:
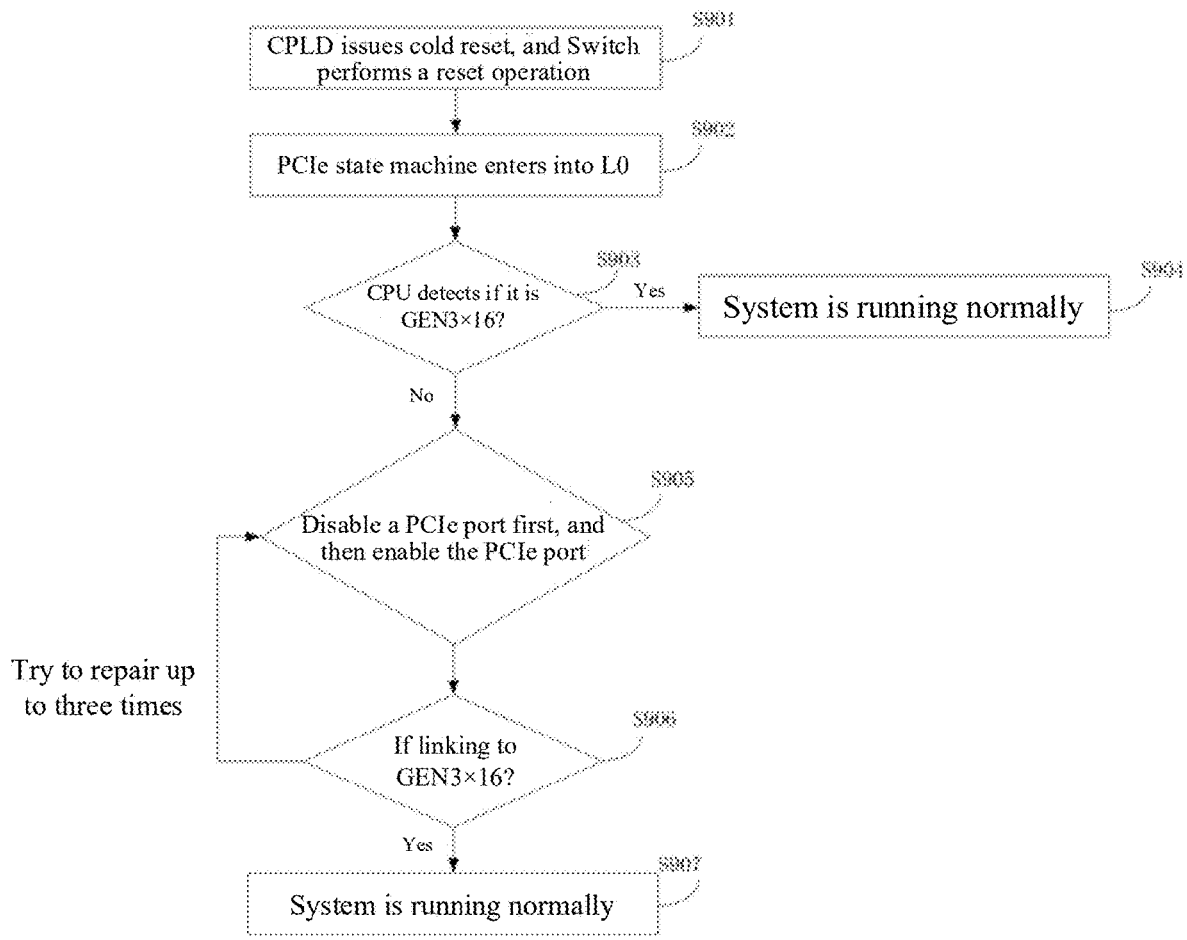
FIG. 9 is a flowchart of a repair method by means of software according to an embodiment of the disclosure.

FIG. 9 is a flowchart of a repair method by means of software in this embodiment. The method includes steps described below.

At S901, a cold reset is issued to the Switch by the CPLD, and the Switch starts to reset.

At S902, PCIe timing enters into L0 of the state machine after the reset is completed.

At S903, the CPU detects whether the PCIe connection with the Switch is GEN3×16.

At S904, if the PCIe is an expected value, the system boots up normally.

S905, if the PCIe is not the expected value, the PCIe port is disabled/enabled up to three times for repair.

At S906, after the repair, it is determined whether the CPU and the PCIe of the Switch are linked to GEN3×16.

At S907, if the CPU and the PCIe of Switch are linked to GEN3×16, it is determined that the system is running normally, otherwise, the method turns to S905.

In this embodiment, in the dual-CPU control NTB interconnection method, dual-CPU control NTB interconnection degrades the combined hardware and software repair approach, the causes of the degradation can be analyzed, thereby solving the NTB lane reduction issues that occur with the CPU, and detect problems that were not found during project testing.

Through the above description to the implementations, it can be clearly understood by those skilled in the art that, the method according to the above embodiment may be implemented by software and necessary universal hardware platform, and of course may be implemented by hardware, but preferably by software and necessary universal hardware platform in many cases. Based on such understandings, the technical solutions of the disclosure or the part thereof contributing to the prior art may be reflected in the form of a software product. The computer software product is stored in a non-transitory readable storage medium (e.g., ROM/RAM, a diskette or a compact disk), and includes several instructions to cause a terminal device (which may be a mobile phone, a computer, a server or a network device, etc.) to perform the method according to each of the embodiments of the disclosure.

This embodiment further provides a switch reset apparatus that is configured to implement the above-mentioned embodiments and implementations, and those that have been explained will not be repeated. As used below; the term "module" may implement a combination of software and/or hardware with predetermined functions. Although the device described in the following embodiment is preferably implemented by software, hardware or a combination of software and hardware is also possible and conceived.

Figure 10:
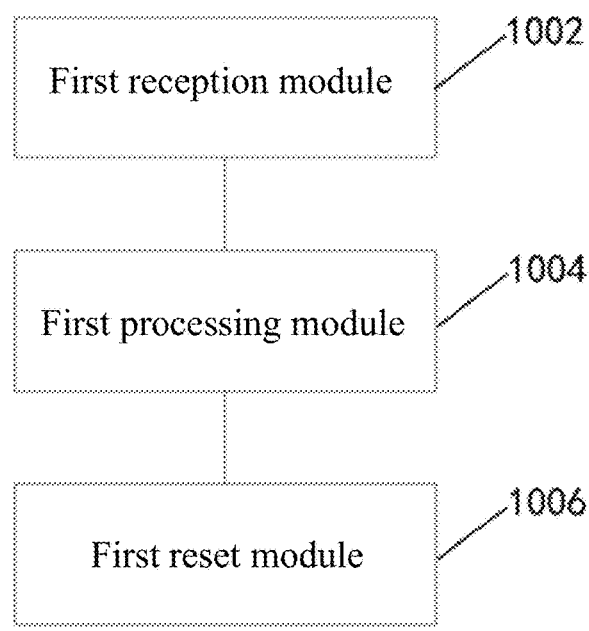
FIG. 10 is a structural block diagram of a switch reset apparatus according to an embodiment of the disclosure.

FIG. 10 is a structural block diagram of a switch reset apparatus according to an embodiment of the disclosure. As shown in FIG. 10, the apparatus includes:

a first reception module 1002, configured to receive signal flag bit information transmitted from a processor, the signal flag bit information being used for indicating that data transmission between the switch and the processor is abnormal;

a first processing module 1004, configured to process a reset signal of the switch based on the signal flag bit information; and a first reset module 1006, configured to transmit the processed reset signal to the switch to instruct the switch to perform a reset operation.

In an exemplary embodiment, the first reception module includes:

a first reception unit, configured to receive the signal flag bit information transmitted from the processor through an IIC.

In an exemplary embodiment, the first processing module includes:

a first release unit, configured to release the reset signal by: pulling down the reset signal to obtain a pull-down signal, and then performing a pull-up operation on the pull-down signal.

In an exemplary embodiment, the apparatus further includes:

a second transmission module, configured to transmit feedback information to the processor after processing the reset signal of the switch based on the signal flag bit information, the feedback information being used for indicating that the signal flag bit has triggered the processing of the reset signal; and a first recording module, configured to record the count that the data transmission link is repaired.

Figure 11:
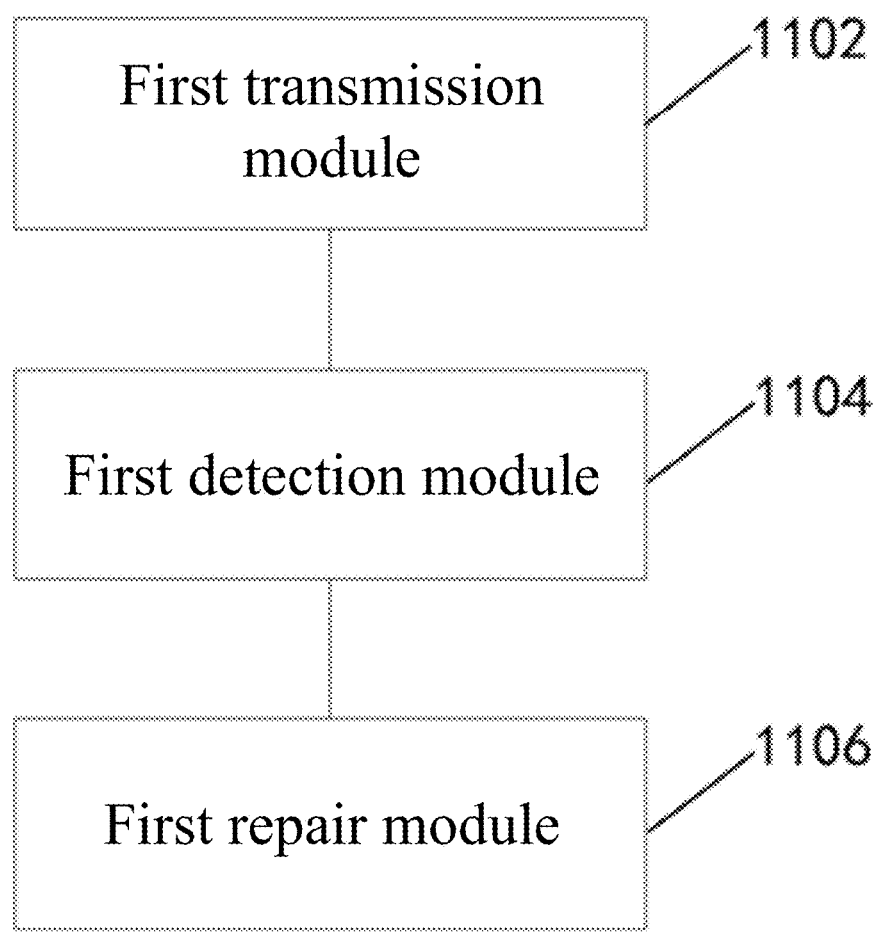
FIG. 11 is a structural block diagram of an apparatus for repairing a data transmission link according to an embodiment of the disclosure.

FIG. 11 is a structural block diagram of an apparatus for repairing a data transmission link according to an embodiment of the disclosure. As shown in FIG. 11, the apparatus includes:

a first transmission module 1102, configured to transmit signal flag bit information to a CPLD to instruct the CPLD to process a reset signal of the switch based on the signal flag bit information, the signal flag bit information being used for indicating that data transmission between the switch and the processor is abnormal, and the switch is configured to receive the processed reset signal transmitted from the CPLD and perform a reset operation;

a first detection module 1104, configured to detect a bandwidth performance of peripheral component interconnect express in the switch, the switch is connected to the processor through a data transmission link; and a first repair module 1106, configured to repair the data transmission link based on the bandwidth performance.

In an exemplary embodiment, the apparatus further includes:

a first determination module, configured to read data in the switch through the data transmission link to determine whether the switch is reset after the signal flag bit information is transmitted to the CPLD and the reset signal is processed.

In an exemplary embodiment, the first repair module includes:

a first repair unit, configured to degrade the bandwidth performance repair the data transmission link if the bandwidth performance does not meet a preset bandwidth performance.

In an exemplary embodiment, the apparatus further includes:

a second processing module, configured to determine that the data transmission link is in a repair abnormal state in the following cases: after the bandwidth performance is degraded to repair the data transmission link in the case that the bandwidth performance does not meet a preset bandwidth performance, the bandwidth performance is degraded to a preset performance; or if the count that the data transmission link is repaired is greater than a preset number, wherein the repair abnormal state includes a state that the data transmission link cannot be repaired.

In an exemplary embodiment, the first detection module includes:

a first reading unit, configured to read data included in the register in the switch through the data transmission link; and a first detection unit, configured to detect the bandwidth performance of PCIe in the switch based on the data read from the register.

It should be noted that the above respective modules are implemented by software or hardware. When the above respective modules are implemented by hardware, they may be implemented by the following manners, including, but not limited to: all above modules being located in the same processor; or the various modules being located in different processors respectively in the form of any combination.

An embodiment of the disclosure further provides a non-transitory computer-readable storage medium. The non-transitory computer-readable storage medium is configured to have stored a computer program therein, wherein the computer program is configured to, while in running, perform the steps in any of the above method embodiments.

In an exemplary embodiment, the non-transitory computer-readable storage medium may include, but not limited to: a U disk, a read-only memory (ROM), a random access memory (RAM), a mobile hard disk drive, a diskette, a compact disc or various media that can store computer programs.

An embodiment of the disclosure further provides an electronic device. The electronic device includes a memory and a processor, the memory is configured to have stored a computer program therein, and the processor is configured to run the computer program so as to perform the steps in any of the above method embodiments.

In an exemplary embodiment, the electronic device may further include a transmission device and an input/output device, the transmission device is connected to the processor, and the input/output device is connected to the processor.

The optional examples in this embodiment may refer to the examples described in the aforementioned embodiments and exemplary implementations, and will not be repeated here.

It is apparent to those skilled in the art that the various modules or steps of the present disclosure described above can be implemented using common computing devices. They can be concentrated on a single computing device or distributed across a network composed of multiple computing devices. They can be implemented with executable program code by computing devices, thereby being stored in a storage device for execution by a computing device. In some cases, the steps shown or described can be executed in a different order than that presented here, or they can be made into individual integrated circuit modules, or multiple modules or steps can be made into a single integrated circuit module for implementation. Thus, the present application is not limited to any specific combination of hardware and software.

The above is merely an optional embodiment of the present disclosure and is not intended to limit the scope of the disclosure. For those skilled in the art, the present disclosure can be subject to various modifications and variations. Any modifications, equivalent substitutions, improvements, etc., made within the principles of the present disclosure should be included within the scope of protection of the disclosure.

The invention claimed is:

1. A switch reset system, comprising:
a processor connected to a switch through a data transmission link;
a complex programmable logic device (CPLD) connected to the processor and the switch, wherein the CPLD is configured to receive signal flag bit information transmitted from the processor, and process a reset signal in the switch based on the signal flag bit information, wherein the signal flag bit information is used for indicating that data transmission between the switch and the processor is abnormal; and
the switch, the switch being configured to receive a processed reset signal transmitted from the CPLD and perform a reset operation;
wherein when processing the reset signal in the switch based on the signal flag bit information, the CPLD is configured to release the reset signal, wherein when releasing the reset signal, the CPLD is configured to obtain a pull-down signal by pulling down the reset signal and perform a pull-up operation on the pull-down signal.

2. The system according to claim 1, wherein the processor is further configured to read data in the switch through the data transmission link and determine whether the switch is reset after the reset signal is processed.

3. The system according to claim 1, further comprising:
an inter-integrated circuits (IIC) bus connected to the processor and the CPLD.

4. The system according to claim 1, wherein the CPLD is further configured to transmit feedback information to the processor after the reset signal is processed based on the signal flag bit information, wherein the feedback information is used for indicating that the signal flag bit has triggered the CPLD to process the reset signal.

5. The system according to claim 1, wherein the signal flag bit information comprises information on cold reset of the switch.

6. The system according to claim 1, wherein the processor further comprises a reception control (RC) device connected to the switch and configured to transmit a downstream to the switch.

7. The system according to claim 1, wherein the switch further comprises a direct memory access (DMA) device connected to the processor and configured to transmit an upstream to the processor.

8. A method for setting a switch, applied to the switch reset system according to claim 1, comprising:
receiving the signal flag bit information transmitted from the processor, wherein the signal flag bit information is used for indicating that data transmission between the switch and the processor is abnormal;
processing the reset signal of the switch based on the signal flag bit information; and
transmitting the processed reset signal to the switch to instruct the switch to perform the reset operation;
wherein the processing the reset signal of the switch based on the signal flag bit information comprises:
releasing the reset signal, wherein the releasing the reset signal comprises: obtaining a pull-down signal by pulling down the reset signal, and performing a pull-up operation on the pull-down signal.

9. The method according to claim 8, wherein the receiving the signal flag bit information transmitted from the processor comprises:
receiving the signal flag bit information transmitted from the processor through an inter-integrated circuits (IIC) bus.

10. The method according to claim 8, after processing the reset signal of the switch based on the signal flag bit information, the method further comprising:
transmitting feedback information to the processor, wherein the feedback information is used for indicating that the reset signal has been triggered to be processed by the signal flag bit; and
recording a count that the data transmission link is repaired.

11. A method for repairing a data transmission link, applied to the switch reset system according to claim 1, comprising:
transmitting the signal flag bit information to the CPLD to instruct the CPLD to process the reset signal of the switch based on the signal flag bit information, wherein the signal flag bit information is used for indicating that data transmission between the switch and the processor is abnormal, and the switch is configured to receive the processed reset signal transmitted from the CPLD and perform the reset operation;
detecting a bandwidth performance of peripheral component interconnect express in the switch, wherein the switch is connected to the processor through the data transmission link; and
repairing the data transmission link based on the bandwidth performance;
wherein the repairing the data transmission link based on the bandwidth performance comprises:
repairing the data transmission link by degrading the bandwidth performance in response to the bandwidth performance not meeting a preset bandwidth performance.

12. The method according to claim 11, after transmitting the signal flag bit information to the CPLD, the method further comprising:
reading data in the switch through the data transmission link and determining whether the switch is reset after the reset signal is processed.

13. The method according to claim 11, after repairing the data transmission link by degrading the bandwidth performance in response to the bandwidth performance not meeting the preset bandwidth performance, the method further comprising:
determining that the data transmission link is in a repair abnormal state in response to the bandwidth performance being degraded to the preset performance, or a count that the data transmission link is repaired is greater than a preset number, wherein the repair abnormal state comprises a state that the data transmission link fails to be repaired.

14. The method according to claim 11, wherein the detecting the bandwidth performance of the peripheral component interconnect express in the switch comprises:
reading data comprised in a register in the switch through the data transmission link; and
detecting the bandwidth performance of the peripheral component interconnect express in the switch based on the data read from the register.

15. The method according to claim 11, wherein the data transmission link is peripheral component interconnect express (PCIe), and the repairing the data transmission link by degrading the bandwidth performance comprises disabling or enabling PCIe port to repair the data transmission link.

16. The system according to claim 1, wherein the data transmission link is peripheral component interconnect express (PCIe).

17. A non-transitory computer-readable storage medium, wherein the storage medium is stored with a computer program that, when executed by a processor, causes the processor to perform operations comprising:
   receiving the signal flag bit information transmitted from the processor, wherein the signal flag bit information is used for indicating that data transmission between the switch and the processor is abnormal;
   processing the reset signal of the switch based on the signal flag bit information; and
   transmitting the processed reset signal to the switch to instruct the switch to perform the reset operation;
   wherein the processing the reset signal of the switch based on the signal flag bit information comprises:
   releasing the reset signal, wherein the releasing the reset signal comprises: obtaining a pull-down signal by pulling down the reset signal, and performing a pull-up operation on the pull-down signal.

18. An electronic device, comprising a memory, a processor, and a computer program stored in the memory that, when executed by the processor, causes the processor to perform operations comprising:
   transmitting the signal flag bit information to the CPLD to instruct the CPLD to process the reset signal of the switch based on the signal flag bit information, wherein the signal flag bit information is used for indicating that data transmission between the switch and the processor is abnormal, and the switch is configured to receive the processed reset signal transmitted from the CPLD and perform the reset operation;
   detecting a bandwidth performance of peripheral component interconnect express in the switch, wherein the switch is connected to the processor through the data transmission link; and
   repairing the data transmission link based on the bandwidth performance;
   wherein the repairing the data transmission link based on the bandwidth performance comprises:
   repairing the data transmission link by degrading the bandwidth performance in response to the bandwidth performance not meeting a preset bandwidth performance.

* * * * *